United States Patent Office 3,697,421
Patented Oct. 10, 1972

3,697,421
CYANIDE REMOVAL FROM WASTE EFFLUENTS
Andrew Carmine Lauria, Ballwin, and Jeffrey Lynn Owens, Florissant, Mo., assignors to Miles Laboratories, Inc., Elkhart, Ind.
No Drawing. Filed Apr. 15, 1971, Ser. No. 134,475
Int. Cl. C02b 1/18
U.S. Cl. 210—59       8 Claims

ABSTRACT OF THE DISCLOSURE

Undesirable cyanide compounds in waste effluents can be converted to non-toxic biodegradable materials by treating such waste effluents with a starch conversion syrup. Preferably the waste effluent is also treated with a metal chelating composition when such effluent contains heavy metal cyanides.

BACKGROUND AND PRIOR ART

The cyanide compounds present in waste effluents from certain chemical manufacturing operations and from metal plating processes can present serious pollution problems. If such waste effluents are discharged into rivers or lakes without proper treatment, the toxic cyanide compounds can contaminate various municipal water supplies. Even if such waste effluents are deposited on land masses, the cyanide contents can eventually pass through the soil and reach water supplies.

Various complex and expensive procedures have been employed in the prior art to eliminate the cyanide content from waste effluents but none of them are completely satisfactory.

SUMMARY OF THE INVENTION

In accordance with the present invention, a process for removing undesirable cyanide compounds from waste effluents by converting the cyanide portion of such compounds to non-toxic materials is provided which comprises reacting a starch conversion syrup with the waste effluent at a temperature from about 18° C. to about 100° C. for from about 15 minutes to about 4 hours, said starch conversion syrup being employed in an amount from about 5 to about 20 pounds of dissolved carbohydrate solids in the syrup for each pound of cyanide compound in the waste effluent.

DESCRIPTION OF THE INVENTION

In carrying out the process of the present invention the waste effluent containing undesirable cyanide compounds is mixed with a starch conversion syrup at a temperature from about 18° C. (64° F.) to about 100° C. (212° F.) for from about 15 minutes to about 4 hours. The higher the reaction temperature, the shorter can be the reaction time. A reaction temperature of 18° C. will require a reaction time of about 4 hours, while a reaction temperature of 100° C. can employ a reaction time of about 15 to 30 minutes. During this reaction the toxic cyanide portions of such compounds are converted to non-toxic materials, such as glucoheptonates. Such materials are biodegradable and thus can be further broken down by natural processes to also reduce the overall pollution which would otherwise be created by adding the original untreated waste effluent to various natural bodies of water, rivers or streams.

The waste effluents suitable for treatment with the present invention can contain relatively soluble cyanide compounds, such as sodium cyanide, potassium cyanide and the like, obtained from chemical manufacturing operations, or they can contain less soluble heavy metal cyanides, such as iron cyanide, nickel cyanide, zinc cyanide and the like, obtained from metal plating processes. When substantially complete removal of cyanides from the waste effluent is desired, it is preferred that such effluent be substantially free of copper cyanides.

The starch conversion syrups useful in the present invention are well known and can be produced by acid or enzyme treatment of starch. These syrups consist essentially of aqueous mixtures of dextrose, maltose, maltotriose and higher saccharides. It is preferred that the starch conversion syrup have a Dextrose Equivalent of from about 35 to about 85. The higher the Dextrose Equivalent of the syrup used, the smaller the amount of syrup needed for the reaction. It is also preferred that the starch conversion syrup initially contain from about 50 weight percent to about 86 weight percent dissolved carbohydrate solids based on the total weight of the syrup.

In carrying out the process of the present invention the starch conversion syrup alone can be added to the waste effluent. In a preferred embodiment of the invention the starch conversion syrup is mixed with water to reduce its viscosity and improve the ease of handling and mixing with the waste effluent. Whether the starch conversion syrup is used alone or in admixture with water, the starch conversion syrup is employed in an amount from about 5 to about 20 pounds of dissolved carbohydrate solids in the syrup for each pound of cyanide compound in the waste effluent being treated.

Starch conversion syrups, especially when mixed with water, are susceptible to undesirable bacterial and/or fungal growth caused by atmospheric contamination if allowed to stand for several days prior to use. It is therefore preferable to add a preservative, such as sodium benzoate, to the starch conversion syrup that will be stored prior to use.

When the waste effluent contains heavy metal cyanides, it is desirable that the metal ions be complexed so that they do not interfere with the reaction between cyanide ions and the sugars in the starch conversion syrup. This can be accomplished by adding a chelating composition, such as ethylenediaminetetraacetic acid, salts of ethylenediaminetetraacetic acid, oxalic acid and salts thereof, citric acid and salts thereof, glycerin and the like, to the waste effluent either before or concurrently with the starch conversion syrup. The preferred metal chelating composition is ethylenediaminetetraacetic acid or a salt thereof. The metal chelating composition is preferably employed in an amount from about 0.8 to about 5 pounds for each pound of cyanide compound in the waste effluent. The metal chelating composition is useful in the substantially complete removal of all cyanides except copper cyanides. The present invention can be used to remove up to 98 percent of copper cyanide contamination, but the copper cyanide complex is difficult to break. Thus the present invention is useful to substantially reduce copper cyanide contamination in waste effluents.

The invention will be described further in the following examples.

EXAMPLE 1

A starch conversion syrup having a Dextrose Equivalent of 70 and containing 82 weight percent dissolved carbohydrate solids was added to a waste effluent containing sodium cyanide in an amount of 5 to 6 lbs. dissolved carbohydrate solids per pound of sodium cyanide in the effluent. The resulting mixture was heated at 100° C. for 30 minutes. The resulting treated effluent was free of detectable cyanide.

EXAMPLE 2

A starch conversion syrup having a Dextrose Equivalent of 36 and containing 80 weight percent dissolved carbohydrate solids was added to a waste effluent containing sodium cyanide in an amount of 20 lbs. dissolved carbohydrate solids per pound of sodium cyanide in the effluent. The resulting mixture was heated at 100° C. for 30 minutes. The resulting treated effluent was free of detectable cyanide.

EXAMPLE 3

A starch conversion syrup having a Dextrose Equivalent of 82 and containing 85 weight percent dissolved carbohydrate solids was added to a metal plating waste effluent containing heavy metal cyanide compounds, such as cadmium cyanide and zinc cyanide, in an amount of 8 lbs. dissolved carbohydrate solids per pound of cyanide compounds in the effluent. Disodium salt of ethylenediaminetetraacetic acid was also added in an amount of 3 lbs. per pound of cyanide compounds in the effluent. The resulting mixture was heated at about 100° C. for 1 hour and then allowed to cool for 1 hour. The resulting treated effluent was free of detectable cyanide.

EXAMPLE 4

An aqueous mixture of 750 lbs. of starch conversion syrup having a Dextrose Equivalent of 82 and containing 85 weight percent dissolved carbohydrate solids, 250 lbs. water and 10 lbs. sodium benzoate (about 25 weight percent water, about 74 weight percent starch conversion syrup and about 1 weight percent sodium benzoate) was added to a waste effluent containing sodium cyanide in an amount of 6.4 lbs. dissolved carbohydrate solids per pound of sodium cyanide. The resulting mixture was heated at 100° C. for 1 hour. The resulting treated effluent was free of detectable cyanide.

EXAMPLE 5

An aqueous mixture of 700 lbs. of starch conversion syrup having a Dextrose Equivalent of 82 and containing 85 weight percent dissolved carbohydrate solids, 223 lbs. water, 10 lbs. sodium benzoate and 88 lbs. disodium salt of ethylenediaminetetraacetic acid (about 22 weight percent water, about 68 weight percent starch conversion syrup, about 9 weight percent disodium salt of ethylenediaminetetraacetic acid and about 1 weight percent sodium benzoate) was added to a metal plating waste effluent containing various heavy metal cyanides, except copper cyanide, in an amount of 6 lbs. of dissolved carbohydrate solids and 0.88 pound of chelating agent per pound of cyanide compounds. The resulting mixture was heated at 100° C. for 1 hour and allowed to cool 1 hour. The resulting treated effluent was free of detectable cyanide.

What is claimed is:

1. A process for removing undesirable cyanide compounds from waste effluents by converting the cyanide portion of such compounds to non-toxic materials which comprises reacting a starch conversion syrup with the waste effluent at a temperature from about 18° C. to about 100° C. for from about 15 minutes to about 4 hours, said starch conversion syrup being employed in an amount from about 5 to about 20 pounds of dissolved carbohydrate solids in the syrup for each pound of cyanide compound in the waste effluent.

2. A process according to claim 1 wherein the starch conversion syrup has a Dextrose Equivalent from about 35 to about 85.

3. A process according to claim 1 wherein the starch conversion syrup initially contains from about 50 weight percent to about 86 weight percent dissolved solids.

4. A process according to claim 1 wherein a metal chelating composition is also reacted with the waste effluent.

5. A process according to claim 4 wherein the metal chelating composition is ethylenediaminetetraacetic acid or a salt thereof.

6. A process according to claim 4 wherein the metal chelating composition is employed in an amount from about 0.8 to about 5 pounds for each pound of cyanide compound in the waste effluent.

7. A process according to claim 1 wherein the starch conversion syrup is employed in an aqueous mixture with a preservative.

8. A process according to claim 4 wherein the starch conversion syrup is employed in an aqueous mixture with a metal chelating composition and a preservative.

References Cited

UNITED STATES PATENTS

| 2,865,853 | 12/1958 | Batdorf | 210—59 |
| 3,354,094 | 11/1967 | Brink et al. | 252—180 |
| 3,394,080 | 7/1968 | Hoffmann et al. | 210—59 |
| 3,412,180 | 11/1968 | Corley | 210—59 X |
| 3,483,033 | 12/1969 | Casey | 252—181 X |
| 3,505,217 | 4/1970 | Morico | 210—59 |
| 3,589,859 | 6/1971 | Foroulis | 252—181 X |

FOREIGN PATENTS

| 487,734 | 1/1952 | Canada | 252—180 |

REUBEN FRIEDMAN, Primary Examiner

T. G. WYSE, Assistant Examiner

U.S. Cl. X.R.

252—180